United States Patent [19]

Komurasaki et al.

[11] 4,373,487
[45] Feb. 15, 1983

[54] IGNITION TIMING CORRECTING SYSTEM FOR INTERNAL COMBUSTION ENGINE

[76] Inventors: Satoshi Komurasaki; Tsuneo Yamane, both of Himeji, Japan

[21] Appl. No.: 249,459

[22] Filed: Mar. 31, 1981

[30] Foreign Application Priority Data

Apr. 3, 1980 [JP] Japan .................................. 55-44405

[51] Int. Cl.³ .............................................. F02P 5/04
[52] U.S. Cl. ..................................... 123/418; 123/424
[58] Field of Search ................ 123/418, 421, 424, 426

[56] References Cited

U.S. PATENT DOCUMENTS 3,815,560  6/1974  Wahl et al. ...................... 123/418 X
4,079,709  3/1978  Schuette ......................... 123/418 X
4,142,489  3/1979  Menard ........................... 123/418 X

*Primary Examiner*—Tony M. Argenbright
*Attorney, Agent, or Firm*—Wenderoth, Lind & Ponack

[57] ABSTRACT

An ignition timing correcting system generate a reference signal at a reference angular position of a rotating internal combustion engine and an ignition signal leading it by a constant phase. A phase shifter normally responds to a control signal from a movable tap on a potentiometer, to retard the ignition signal to form a retarded ignition signal. The phase comparison of the two signals produces an advance or a retardation correcting signal formed of a pulse train having a pulse-width corresponding to a phase difference between the two ignition signals. During the idling of the engine, the correcting signal drives forwardly or reversely an electric reversible motor to move the tap on the potentiometer to adjust the control signal. During the warm-up of the engine, the phase shifter is supplied with the sum of the control signal and a signal with a predetermined voltage to further retard the ignition signal.

4 Claims, 3 Drawing Figures

IGNITION TIMING CORRECTING SYSTEM FOR INTERNAL COMBUSTION ENGINE

BACKGROUND OF THE INVENTION

The present invention relates to a system for correcting a shift of the ignition timing occurring in the ignition device used with internal combustion engines.

In recent years ignition devices used with motor vehicles have required an increase in their output energy and have required improved accuracy and stability of the ignition timing in view of the purification of the exhaust gases from motor vehicles. Under these circumstances, ignition devices of the conventional contact breaker type are increasingly replaced by those of the fully transistorized type without contact breakers.

In this fully transistorized type of ignition device, the ignition timing signal is provided by a contactless signal generator such as an electromagnetic coil generator, an integrated circuit Hall generator or the like, but such a generator is disposed within a mating distributor which is, in turn, usually driven by a crankshaft connected to an associated internal combustion engine through a timing belt or the like. Even in fully transistorized ignition devices, therefore, a shift of the ignition timing due to ageing in the distributor driving system is increased with time. This shift of the ignition timing appears as a shift of the ignition timing developed, for example, during the idling of the engine and has greatly affected the output from the engines and the ingredients of the exhaust gases from the engines.

Therefore, the shift of the ignition timing is undersirable in view of measures to counter the exhaust gas emissions from internal combustion engines. Thus, it is desirable to correct a shift of the ignition timing of internal combustion engines and particularly during the warm-up thereof by some measure.

SUMMARY OF THE INVENTION

Accordingly, it is an object of the present invention to provide a new and improved system for correcting an ignition timing of an internal combustion engine by generating a reference signal at a reference angular position and an ignition signal with the advance characteristic preliminarily leading by a predetermined angle respectively, producing a retarded ignition signal by retarding the ignition signal and controlling the retardation of the ignition signal so as to put the phase relationship between the reference signal and the retarded ignition signal in a predetermined state when the internal combustion engine is operated in a predetermined mode whereby the retarded ignition signal is corrected to the regular ignition timing.

It is another object of the present invention to provide a new and improved system for correcting an ignition timing of an internal combustion engine, which system eliminates the necessity of adjusting the initial ignition timing and also corrects shifts of the ignition timing due to ageing by enabling the correction during the normal mode of operation of the internal combustion engine through the use of a control magnitude stored in a memory means.

It is still another object of the present invention to provide a new and improved system for correcting an ignition timing of an internal combustion engine, which system can easily control the ignition timing in the electronic manner with a simple construction by utilizing a phase shifter means for correcting the ignition timing along with means for changing a control input to the phase shifter means from its magnitude determined by a control magnitude for correcting the ignition timing to a predetermined magnitude while controlling easily an advance and a retardation of the ignition timing so as to be suited for the particular mode of operation of the internal combustion engine.

The present invention provides an ignition timing correcting system for an interval combustion engine comprising a reference generator means for generating a pulsed reference signal at a reference angular position of the rotation of an internal combustion engine, and an ignition generator means for generating a pulsed ignition signal at an angular position of the rotation of the engine leading that for the pulsed reference signal, the pulsed ignition timing signal having a predetermined advance characteristic, a phase shifter means is connected to the ignition generator means to retard the pulsed ignition signal in response to a control input applied thereto to produce an output, and the ignition means is connected to the phase shifter means to generate a pulsed ignition voltage in response to the output from the phase shifter means. A memory means is disposed to generate a control signal applied to the phase shifter means to determine a retardation of the ignition signal provided by the phase shifter. The present invention further comprises a control means for controlling a magnitude of the control signal in response to the phase relationship between the reference signal and the output from the phase shifter means so as to impart to the output from the phase shifter a predetermined phase relative to the reference signal in a predetermined mode of operation of the internal combustion engine, and a means for changing the magnitude of the control input to the phase shifter from its magnitude determined by the control signal to its magnitude determined by a predetermined mode of operation of the internal combustion engine.

BRIEF DESCRIPTION OF THE DRAWING

The present invention will become more readily apparent from the following detailed description taken in conjunction with the accompanying drawing in which.

DESCRIPTION OF THE PREFERRED EMBODIMENTS

Figure 1:
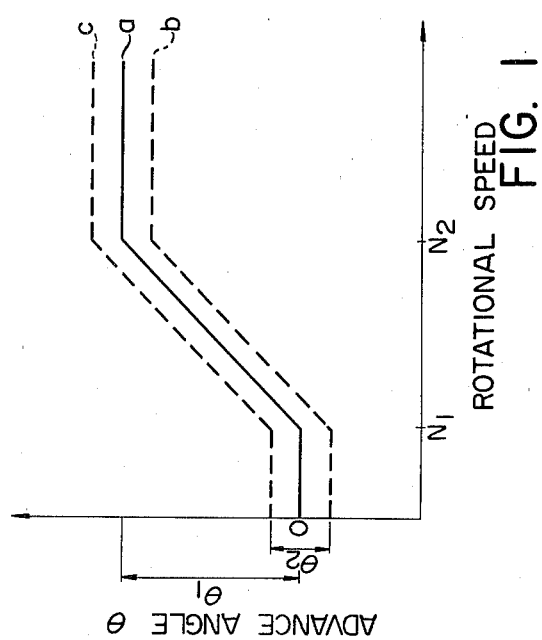
FIG. 1 is a graph illustrating the centrifugal advance characteristic of the ignition time previously developed in interval combustion engines.

For a better understanding of the nature of the present invention, a shift of an ignition timing will now be described in conjunction with FIG. 1 wherein there is illustrated the centrifugal advance characteristic of the ignition timing. In FIG. 1, the axis of the ordinate represents an advance angle $\theta$ of an ignition timing and the axis of the abscissa represents the rotational speed of an interval combustion engine. Solid line a designates the regular advance characteristic of the ignition timing and dotted lines b and c, located below and above the solid line a, respectively designate the advance characteristics of the ignition timing shifted respectively to the retarding and advancing sides due to ageing in an associated system for driving a distributor.

In the early days of any internal combustion engine, ageing results in the ignition timing having no shift. Therefore during the start or idling of the engine having a rotational speed $N_1$ or less, the ignition timing is of a reference magnitude or a zero advance angle as shown by solid line a shown in FIG. 1. As the speed of the engine rises from its magnitude $N_1$, the ignition timing advances until the ignition timing reaches a maximum angle $\theta_1$ at the speed $N_2$ of the engine as shown by solid line a in FIG. 1. Thereafter, the ignition timing is held at the maximum angle $\theta_1$ as also shown by solid line a in FIG. 1 until the engine reaches a maximum speed.

However, the longer the service of the engine the more the ignition timing is shifted due to ageing as described above.

On the other hand, the machining accuracy of distributors and internal combustion engines may result in the initial shift of the ignition timing or the initial adjustment. This initial shift of the ignition timing has been generally corrected by adjusting an angular position of the distributor relative to a reference. To this end, a mounting for the distributor is designed and constructed so that it is rotatable. Such a construction is convenient for the official checkout of motor vehicles whereas it may cause a danger that the ignition timing is intentionally put out of order. This has resulted in the deterioration of the exhaust gas emissions from interval combustion engines.

Various factors as described above have caused the ignition timing to be shifted as shown at dotted line b or c in FIG. 1. The shift $\theta_2$ of the ignition timing as shown in FIG. 1 is undesirable in view of measures to counter the exhausted gas and it is necessary to correct the shift of the ignition timing according to some measure.

Figure 2:
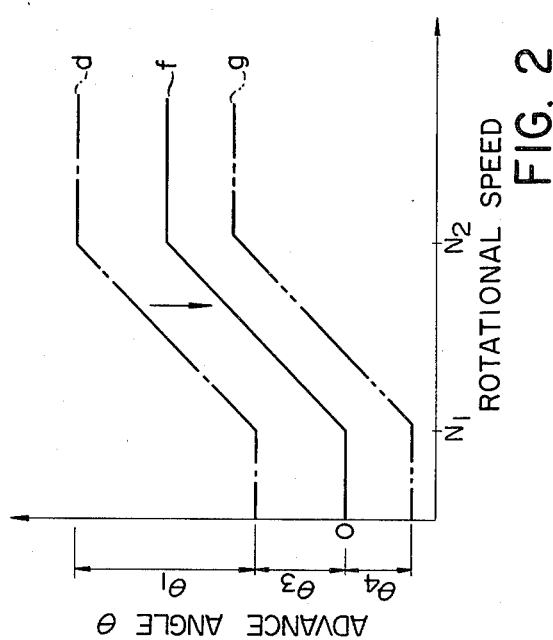
FIG. 2 is a graph similar to FIG. 1 and useful in explaining the fundamental principles of the present invention.

FIG. 2 shows the centrifugal advance characteristics useful in explaining the fundamental principles of the present invention. In FIG. 2, the axis of the ordinate represents an advance angle $\theta$ of the ignition timing of an associated internal combustion engine and the axis of the abscissa represents the rotational speed of the engine as in FIG. 1. Broken line d designates the advance characteristics of ignition timing signals obtained with an ignition generator disposed within an associated distributor and leading the desirable regular advance characteristic designated by solid line f by a constant angle $\theta_3$. Thus, by regarding the ignition timing signal by the constant angle $\theta_3$ over the entire range of rotation of the internal combustion engine, the advance characteristic d can result in the regular advance characteristic as shown at solid line f in FIG. 2.

More specifically, the present invention is arranged to generate from an ignition generator a pulsed ignition signal having a phase leading a regular phase by more than the width of variations in ignition timing, to sense a phase difference of the ignition timing signal relative to the regular phase, for example, during the idling of an associated internal combustion engine and store it in a suitable memory means. The width of variation in ignition timing corresponds to an initial shift or adjustment angle due to the machining accuracy of the internal combustion engine and an associated distributor and a varied angle due to ageing of the internal combustion engine. The stored phase difference is used to retard the ignition timing signal to the regular phase to thereby correct the ignition timing.

Figure 3:
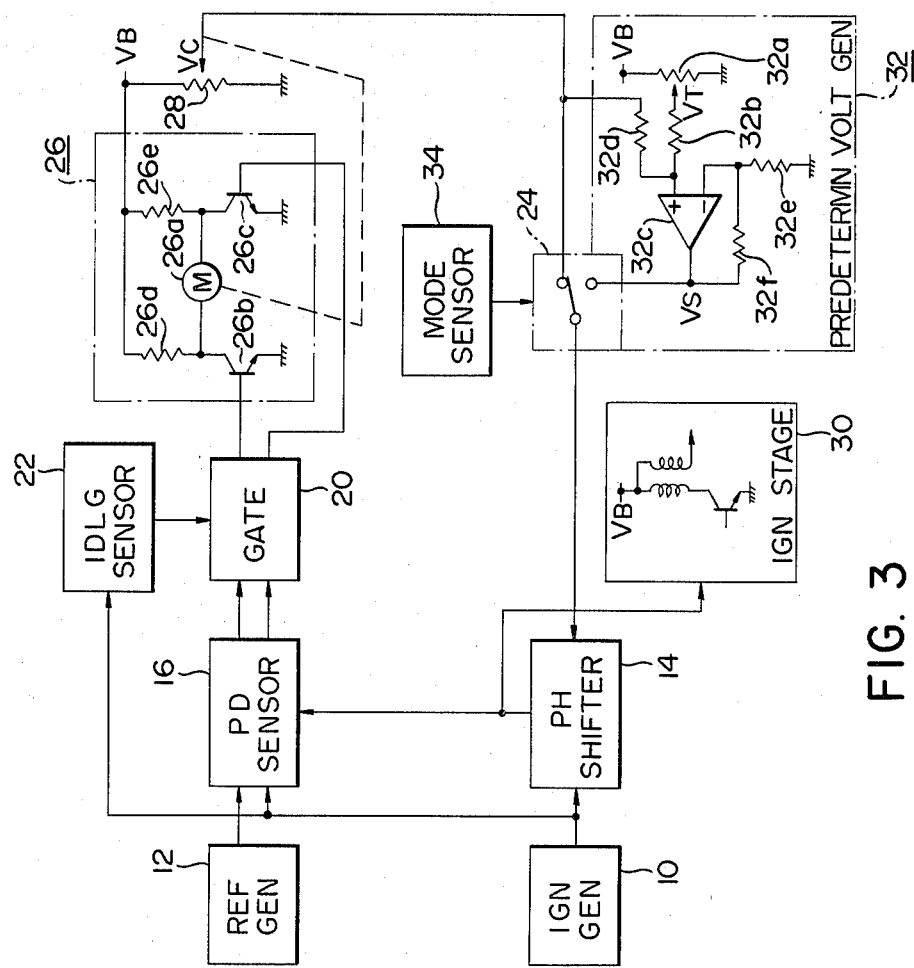
FIG. 3 is a combined circuit and block diagram of one embodiment according to the ignition timing correcting system of the present invention used with internal combustion engines.

Referring now to FIG. 3, there is illustrated one embodiment according to the ignition timing control system of the present invention used with internal combustion engines. The arrangement illustrated comprises an ignition generator 10 disposed within an associated distributor (not shown), a reference generator 12 disposed on a crankshaft for an associated internal combustion engine, a phase shifter 14 connected to the ignition generator 10, and a phase difference sensor 16 connected to the ignition and reference generator 10 and 12 respectively and also to the phase shifter 14. The phase difference sensor 16 has a pair of outputs connected to a gate circuit 20 to which an idling sensor 22 is connected.

The gate circuit 20 has a pair of outputs connected to a reversible driving device generator designated by the reference numeral 26.

The reversible driving device 26 is shown in block 26 as including an electric reversible motor 26a, a pair of common emitter NPN transistors 26b and 26c having respective base electrodes connected to the pair of outputs of the gate circuit 20 and respective collector electrodes connected across the reversible motor 26a. The collector electrodes of the transistors 26b and 26c are also connected via respective collector resistors 26d and 26e to a variable resistor, in this case, a potentiometer 28. The potentiometer 28 is then connected between a voltage point $V_B$ and ground and includes a movable tap controlled by the reversible motor 26a and connected to the phase shifter 14 through a transfer switch 24. The phase shifter 14 is further connected to an ignition stage generally designated by the reference numeral 30 and shown as including a well known ignition coil and a well known common emitter NPN transistor serving as a switch connected to a primary winding of the ignition coil which is, in turn, connected to a source voltage $V_B$.

The arrangement further comprises a predetermined voltage generator generally designated by the reference numeral 32 and shown in block 32 as including a variable resistor, in this case, a potentiometer 32a connected between the source voltage $V_B$ and ground and having a movable tap connected to a resistor 32b subsequently connected to a positive input of an operational amplifier 32c. The operational amplifier 32c has its positive input also connected to the movable tap on the potentiometer 28 through a resistor 32d and has its negative input connected to ground through a resistor 32e and also to its output through a resistor 32f.

The transfer switch 24 has a pair of stationary contacts, one of which is connected to the movable tap on the potentiometer 28 and the other of which is connected to the output of the operational amplifier 32. The transfer switch 24 has its movable arm connected to the phase shifter 14.

A mode sensor 34 is operatively coupled to the transfer switch 24.

The arrangement of FIG. 3 is operated as follows: The ignition generator 10 generates an ignition signal having the advance characteristic (see broken line d, FIG. 2) dependent upon the speed of the internal combustion engine. The ignition signal is applied to the phase shifter 14 where the phase thereof is retarded in accordance with or proportional to a control input or control signal from the movable tap on the potentiometer 28 to produce a retarded ignition timing signal. The phase shifter 14 is, for example, operative to charge and discharge a capacitor (not shown) provided with a constant current dependent upon the control input applied thereto within each time period of the ignition signal, inverting one to the other of the charging and discharging upon a voltage across the capacitor reaching a predetermined level, and making this inversion timing a retardation timing to thereby control the retardation of the ignition signal in response to the control input. The retarded ignition time signal is applied to both the ignition stage 30 and the phase difference sensor 16.

The ignition stage 30 is responsive to the retarded ignition signal to produce an ignition voltage.

On the other hand, the reference generator 12 senses a reference angular position of the crankshaft to generate a pulsed reference signal at a predetermined angular position remaining unchanged with the rotation of the internal combustion engine. The regular angular position is determined to correspond to an angular position where the engine is required to ignite in the idling mode of operation. Therefore, the reference signal serves as a reference for the correction of an ignition timing. The reference and retarded ignition signals are supplied to the phase difference sensor 16 which, in turn, senses a phase difference between the retarded ignition signal and the reference signal to produce an advance or a retardation correcting signal as the case may be, formed of a pulse train having a pulse width corresponding to the sensed phase difference. The advance or retardation correcting signal is delivered to one of its outputs.

The idling sensor 22 receives the pulsed ignition signal from the ignition generator 10 to sense or determine if the internal combustion engine is in the idling mode of operation. If so, the idling sensor 22 delivers an idling signal to the gate circuit 20.

Thus, the gate circuit 20 controls the passage of the correcting signal therethrough in response to the output from the idling sensor 22 and the lock generator 18. More specifically, during the idling mode of operation, as determined by the idling sensor 22, the gate circuit 20 is gated to pass the advance or retardation correcting signal from the phase difference sensor 16 therethrough.

The advance or retardation correcting signal passed through the gate circuit 20 is applied to either one of the transistors 26b or 26c in the reversible driving device 26 as the case may be. That transistor 26b or 26c applied with the correcting signal is turned on to rotate the reversible motor 26a in a direction as determined by the type of the correcting signal developed at that time.

During this rotation of the reversible motor 26a, the movable tap is moved along the potentiometer 28 toward the end thereof as determined by the direction of rotation of the reversible motor 26a until it is stopped and maintained at its adjusted position on the potentiometer 28 upon the decay of the correcting signal. Therefore, the potentiometer 28 generates and mechanically stores a control voltage, as determined by the adjusted position of the movable tap thereon, and applies the control voltage to the phase shifter 14 through the transfer switch 24.

The phase shifter 14 is responsive to a difference in the control voltage previously applied thereto and that now applied thereto to control the retardation of the ignition signal in a direction to decrease a phase difference between the reference and retarded signal. In other words, the phase shifter 14 produces the retarded ignition signal having its retardation controlled in accordance with the phase relationship between the reference and retarded ignition signals through the closed loop control. Therefore, the retarded ignition signal has its phase corrected to the reference position resulting from the reference signal during the idling mode of operation of the associated internal combustion engine.

When the internal combustion engine is put in any mode other than the idling mode of operation, the idling sensor 22 prevents the correcting signal from the phase difference sensor 16 to pass through the gate circuit 20. Therefore, the reversible driving device 26 is stopped but the potentiometer 28 mechanically stores and holds the control voltage at the position of the movable tap thereon adjusted in the idling mode of operation as described above. Therefore, even when the internal combustion engine is operated in any mode other than the idling mode, the advance characteristic of the ignition signal is corrected by the correcting angle provided in the idling mode of operation thereof. This results in ignition sparks having the regular advance characteristic as shown at solid line f in FIG. 2.

Even if the ignition signal would change in angular position of occurrence thereof due to ageing in a route along which a distributor involved is driven, a variation in or a displacement of a position where the distributor is mounted or the like, the ignition timing is always and automatically corrected to its regular angle position relative to the reference signal acting as a reference.

On the other hand, the predetermined voltage generator 32 generates a predetermined voltage $V_S$ by adding a specified voltage $V_T$ to the control voltage $V_C$ at the movable tap on the potentiometer 28. More specifically, the movable tap on the potentiometer 32a produces the specified voltage $V_T$ by dividing the source voltage $V_B$ applied across the potentiometer 32a and delivers the voltage $V_T$ to the positive input of the operational amplifier 32c through the resistor 32b. By selecting magnitudes of resistances of the resistors 32b, 32d, 32e and 32f to be equal and also sufficiently higher than those of the potentiometers 28 and 32a, its operational amplifier 32c produces at the output the predetermined voltage $V_S$ which is equal to the control voltage $V_C$ added to the specified voltage $V_T$.

The mode sensor 34 senses the warm-up mode of operation of the internal combustion engine in response to the temperature of the water cooling the engine. In the warm-up mode as sensed thereby, the mode sensor 34 causes the movable arm of the transfer switch 24 to disengage from the stationary contact connected to the movable tap on the potentiometer 28 and engage the stationary contact connected to the output of the operational amplifier 32c. Therefore, the phase shifter 14 is supplied with the predetermined voltage $V_S$ from the set voltage generator 32 in place of the control voltage $V_C$ from the potentiometer 28. Under these circumstances, the phase shifter 14 retards the ignition signal with the advance characteristic as shown at broken line d in FIG. 2 by an angle $(\theta_3 + \theta_4)$ to produce a retarded ignition signal having the advance characteristic as shown at broken line g in FIG. 2. This results in the internal combustion engine igniting at an ignition timing lagging the regular ignition timing by an angle $\theta_4$. As the engine is ignited at a timing lagging the regular ignition timing, time interval required for the warm-up mode of operation of the engine is reduced. As a result thereof, the engine can be quickly transferred to the normal mode of operation.

From the fogregoing it is seen that it is possible for the ignition timing, in addition to the correction thereof, to be electronically controlled with an extremely simple measure to switch the control input to the phase shifter 14 for correcting the ignition timing to the regular ignition timing.

It will readily be understood that the regarded angle $\theta_4$ may be controlled at will by moving the movable tap of the potentiometer 32a to adjust the specified voltage $V_T$.

From the foregoing it is seen that the present invention is arranged to generate a reference signal at a reference angular position and an ignition signal having the advance characteristic preliminarily leading by a predetermined angle respectively, and to correct the ignition signal to the regular ignition timing by controlling a retardation of the ignition timing signal so as to put the phase relationship between the reference signal and a retarded ignition signal resulting from the retardation of the ignition signal in a predetermined state during a predetermined mode of operation of an associated internal correcting signal. Furthermore, the present invention is enabled in the normal mode of operation of the engine to correct the ignition timing with a control magnitude which may be mechanically stored in a memory means, in this case, the potentiometer 28 with the movable tap. Therefore, the present invention eliminates the necessity of adjusting the initial ignition timing and can also always provide the regular ignition timing characteristic by correcting shifts of the ignition timing due to ageing of the engine components. Furthermore, by providing means for changing a control input to a phase shifter means for correcting the retardation from its magnitude as determined by a control magnitude for correcting the ignition timing to a predetermined magnitude, the ignition timing can easy be controlled in the electronic manner with simple measure utilizing the phase shifter means and it is also easily possible to control the advance and retardation to be suited for the particular mode of operation of the internal combustion engine.

While the present invention has been illustrated and described in conjunction with a single preferred embodiment thereof it is to be understood that numerous changes and modifications may be resorted to without departing from the spirit and scope of the present invention.

For example, while the present invention has been described in conjunction with the control of the retardation of the ignition timing during the warm-up mode of operation of an associated internal combustion engine it is to be understood that the same is equally applicable to the control of the ignition timing with the internal combustion engine operated in any mode, for example, at any ambient temperature, at any barometric pressure, or under loading. Furthermore, the predetermined voltage generator is not limited to the predetermined voltage equal to the sum of the control voltage $V_C$ and the specified voltage $V_T$ but the same may generate any predetermined constant voltage. Alternatively, the set voltage generator may generate the control voltage $V_C$ minus the specified voltage $V_T$ to control an advance of the ignition time leading the regular ignition timing.

The mode sensor 34 may sense such a mode of operation of the engine. At that time, the specific voltage $V_T$ is controlled to its suitable magnitude by the tap on the potentiometer 32a.

What is claimed is:

1. An ignition time correcting system for an internal combustion engine comprising a reference generator means for generating a reference signal at a reference angular position of the rotation of an internal combustion engine, an ignition generator means for generating an ignition signal at an angular position of the rotation of the engine leading that for said reference signal, said ignition signal having a predetermined advance characteristic, a phase shifter means connected to said ignition generator means to control a retardation of said ignition signal in response to a control input applied thereto, an ignition means connected to said phase shifter means to generate an ignition voltage with an output from said phase shifter means, a control signal generator means for generating a control signal for determining the retardation of said ignition signal provided by said phase shifter means, a control means for controlling a magnitude of said control signal in response to the phase relationship between said reference signal and said output from said phase shifter means so as to impart to said output from said phase shifter means a predetermined phase relative to said reference signal in a predetermined mode of operation of the internal combustion engine, and means for changing the magnitude of said control input to said phase shifter means from its magnitude determined by said control signal to its magnitude predetermined by a predetermined mode of operation of the internal combustion engine.

2. An ignition time correcting system for an internal combustion engine as claimed in claim 1, wherein said means for changing includes a mode sensor for sensing said predetermined mode of operation of the internal combustion engine to produce a mode sensed signal, a predetermined voltage generator including a variable resistor for generating a specified voltage determined by the sensed mode of operation of the engine, and an operational amplifier connected to both said control signal generator means and said variable resistor to produce a predetermined voltage equal to a voltage of said control signal plus said specified voltage, and a transfer switch for normally connecting said control signal generator means to said phase shifter means and responsive to said mode sensed signal from said mode sensor to connect said operational amplifier to said phase shifter means.

3. An ignition time correcting system for an internal combustion engine as claimed in claim 1, wherein said means for changing includes a mode sensor for sensing said predetermined mode of operation of the internal combustion engine to produce a mode sensed signal, a predetermined voltage generator including a variable resistor for generating a specified voltage determined by the sensed mode of operation of the engine, and an operational amplifier connected to both said control signal generator means and said variable resistor to produce a predetermined voltage equal to a voltage of said control signal minus said specified voltage, and a transfer switch for normally connecting said control signal means to said phase shifter means and responsive to said mode sensed signal from said mode sensor to connect said operational amplifier to said phase shifter means.

4. An ignition timing correcting system as claimed in any one of claims 1–3, wherein said control signal generator means stores the value of said control signal.

* * * * *

UNITED STATES PATENT AND TRADEMARK OFFICE
CERTIFICATE OF CORRECTION

PATENT NO. : 4,373,487

DATED : February 15, 1983

INVENTOR(S) : Satoshi KOMURASAKI et al.

It is certified that error appears in the above—identified patent and that said Letters Patent is hereby corrected as shown below:

On the title page:

Above item [21], please insert the following:

--[73] Assignee: MITSUBISHI DENKI KABUSHIKI KAISHA
Chiyodaku, Tokyo, Japan--.

Signed and Sealed this

Fourth Day of October 1983

[SEAL]

Attest:

GERALD J. MOSSINGHOFF

Attesting Officer

Commissioner of Patents and Trademarks